United States Patent
Fradet et al.

(10) Patent No.: US 9,456,255 B2
(45) Date of Patent: Sep. 27, 2016

(54) METHOD FOR PROCESSING AN AUDIOVISUAL CONTENT AND CORRESPONDING DEVICE

(71) Applicant: Thomson Licensing, Issy de Moulineaux (FR)

(72) Inventors: Matthieu Fradet, Cesson Sevigne (FR); Alasdair Newson, Cesson Sevigne (FR); Cedric Penet, Cesson Sevigne (FR)

(73) Assignee: THOMSON LICENSING, Issy de Moulineaux ( * ) Notice: Subject to any disclaimer, the term of this patent is extended or adjusted under 35 U.S.C. 154(b) by 0 days.

(21) Appl. No.: 13/716,010

(22) Filed: Dec. 14, 2012

(65) Prior Publication Data

US 2013/0156398 A1    Jun. 20, 2013

(30) Foreign Application Priority Data

Dec. 19, 2011    (FR) ..................... 11 61932

(51) Int. Cl.
| | | |
|---|---|---|
| *G11B 27/034* | (2006.01) | |
| *H04N 21/83* | (2011.01) | |
| *H04H 60/37* | (2008.01) | |
| *H04N 21/44* | (2011.01) | |
| *H04N 21/454* | (2011.01) | |

(52) U.S. Cl.
CPC .............. *H04N 21/83* (2013.01); *H04H 60/37* (2013.01); *H04N 21/44* (2013.01); *H04N 21/454* (2013.01)

(58) Field of Classification Search
USPC ............... 386/278, 280, 281, 282, 285, 286; 725/25, 28
See application file for complete search history.

(56) References Cited

U.S. PATENT DOCUMENTS

| | | | |
|---|---|---|---|
| 6,052,508 A * | 4/2000 | Mincy et al. | 386/281 |
| 6,075,550 A | 6/2000 | Lapierre | |
| 6,115,057 A * | 9/2000 | Kwoh et al. | 725/28 |
| 7,139,031 B1 | 11/2006 | Bray | |
| 7,577,970 B2 * | 8/2009 | Jarman | 725/25 |
| 2004/0049780 A1 | 3/2004 | Gee | |
| 2004/0205334 A1 | 10/2004 | Rennels | |
| 2005/0086069 A1 | 4/2005 | Watson et al. | |

(Continued)

FOREIGN PATENT DOCUMENTS

| | | |
|---|---|---|
| KR | 2011032727 | 3/2011 |
| WO | WO02089473 | 11/2002 |

(Continued)

OTHER PUBLICATIONS

Utray, et al. "The Present and Future of Audio Description and Subtitling for the Deaf and Hard of Hearing in Spain", Meta Journal, Jun. 2009, pp. 250-263, vol. 54, No. 2.

(Continued)

*Primary Examiner* — Daquan Zhao
(74) *Attorney, Agent, or Firm* — Tutunjian & Bitetto, P.C.

(57) ABSTRACT

The invention relates to a method for processing an audiovisual content aiming to censure scenes called sensitive scenes, for example scenes comprising sex and/or violence, in the audiovisual content and a device implementing the method. According to the invention, the display of a sensitive scene of the audiovisual content is replaced, during the temporal interval intended for the display of said sensitive segment, by the reproduction of audio-description data of the audio-description signal that is usually intended for blind or visually impaired persons.

7 Claims, 1 Drawing Sheet

(56) References Cited

U.S. PATENT DOCUMENTS

| | | | |
|---|---|---|---|
| 2006/0130119 A1 | 6/2006 | Candelore et al. | |
| 2006/0130121 A1 | 6/2006 | Candelore et al. | |
| 2007/0250852 A1 | 10/2007 | Adams et al. | |
| 2008/0240671 A1 | 10/2008 | Yamasaki et al. | |
| 2009/0102848 A1 | 4/2009 | Park et al. | |
| 2011/0321075 A1* | 12/2011 | Brunkhorst et al. | 725/13 |
| 2013/0107121 A1* | 5/2013 | Blanchard | 348/563 |

FOREIGN PATENT DOCUMENTS

| | | | | |
|---|---|---|---|---|
| WO | WO 2006/112822 | * | 10/2006 | H04H 9/00 |
| WO | WO2006112822 | | 10/2006 | |

OTHER PUBLICATIONS

The French Search Report dated Jul. 19, 2012.

Datta et al., "Person-on-Person Violence Detection in Video Data", International Conference on Pattern Recognition, Quebec, Canada, Aug. 11, 2002, pp. 433-438.

Everingham et al., " Hello ! My name is . . . Buffy— automatic naming of characters in TV video", British Machine Vision Conference, Edinburgh, Scotland, UK, Sep. 4, 2006, pp. 1-10.

Giannakopoulos et al., "A Multi-Class Audio Classification Method With Respect to Violent Content in Movies Using Bayesian Networks", IEEE 9th Workshop on Multimedia Signal Processing, Chania, Crete, Greece, Oct. 1, 2007, pp. 90-93.

Laptev et al., "Retrieving actions in movies", International Conference on Computer Vision, Rio de Janeiro, Brazil, Oct. 14, 2007, pp. 1-8.

Laptev et al., "Learning realistic human actions from movies", Conference on Computer Vision and Pattern Recognition, Anchorage Alaska, USA, Jun. 24, 2008, pp. 1-8.

Pikrakis et al., "Gunshot Detection in Audio Streams From Movies by Means of Dynamic Programming and Bayesian Networks", International Conference on Acoustics, Speech and Signal Processing, Las Vegas, Nevada, USA, Mar. 31, 2008, pp. 21-24.

Sankar et al., "Subtitle-free Movie to Script Alignment", British Machine Vision Conference, London, England, UK, Sep. 7, 2009, pp. 1-11.

French Search Report dated Jul. 19, 2012.

* cited by examiner

METHOD FOR PROCESSING AN AUDIOVISUAL CONTENT AND CORRESPONDING DEVICE

This application claims the benefit, under 35 U.S.C. §119 of FR Patent Application 1161932, filed 19 Dec. 2011.

BACKGROUND

The present invention relates to a method for processing an audiovisual content aiming to censure certain scenes of an audiovisual content. More specifically the invention relates to pre-recorded audiovisual contents (television programme, film).

Among these audiovisual contents, some may contain scenes that are inappropriate for a young public, for example scenes of a sexual or violent nature. These scenes can shock or disturb a young public. For this reason, a warning signage was created, specifically in France, to indicate the target audience to viewers of the television programme or film being diffused. This signage is in the form of pictograms displayed on the bottom right of the screen. The display of this signage informs the public of the content type but does not prevent viewing of the content.

In addition, parental control systems have also been developed to block partial or total access to these audiovisual contents. Among these systems, some were designed to skip sequences of audiovisual content inappropriate for young viewers. The main disadvantage of these systems is that they introduce a loss of information for the viewer as the sequences that are inappropriate for young viewers are deleted. The comprehension of the scenario is thus rendered more difficult for the viewer. For example, if a combat scene is skipped in which an actor loses an arm, the viewer can then be confused, or disorientated when the next scene is displayed showing the actor with one arm amputated though this same actor was fine in the preceding scene. This scene deletion is also uncomfortable for the viewer as this latter does not know who cut the arm of the actor or how it happened. What is even more disturbing is that the viewer doesn't even know if the response to his questions is contained in the deleted scenes. In fact, the combat scene could have been filmed in a way so that the viewer does not see who cut the arm of the actor.

To overcome this loss of information, it is known via the document U.S. Pat. No. 6,115,057 to replace each sensitive sequence by a text describing the action that takes place during said sequence. The text is displayed in the place of the inappropriate sequence during the duration of the sequence. The viewer thus has all the information available and necessary for the comprehension of the scenario. This text can be transmitted in the video frames.

In this method of the prior art, the text displayed during the deleted sequence comprises however a relatively low quantity of words, corresponding to the quantity of words that the viewer can read during the duration of the deleted sequence. This quantity of words is even lower if the text is addressed more specifically at a young public. The quantity of words displayed must therefore be limited to what a child or adolescent can read over the duration of the deleted sequence. Even if this text is then voice synthesized, the quantity of information transmitted to the viewer remains limited and may be insufficient to properly describe the content of the deleted sequence.

It is further known from document U.S. 2004/205334 a method and a system for screening offensive material in a digital transmission. A computer program code within the radio modifies the digital transmission by blanking out a portion of the digital transmission where the offensive material code is located. Alternatively, the user-selected option may request that the radio substitute the objectionable content with a pre-defined insertion signal such as a tone, a sequence of tones, a stored audio stream, or a stored video stream. The digital content is presented to the user with the obscene content replaced by the user-selected option. In this method there is no indication of a text displayed during the deleted sequence which properly describe the content of the deleted sequence.

One aim of the present invention is to propose a method enabling the viewer to be provided with sufficient information on the deleted sequence over the duration of this sequence and that it be simple and inexpensive to implement.

SUMMARY

For this purpose, the present invention proposes a method for processing an audiovisual content comprising a plurality of audiovisual segments, each of the audiovisual segments being intended to be displayed during an associated temporal interval, said method comprising the following steps for:
 detecting among said audiovisual segments at least one audiovisual segment responding to the predetermined criterion, called a sensitive segment,
 displaying sequentially on a screen said audiovisual segments with the exception of said at least one sensitive segment,
 notable in that it further comprises the following steps for:
 acquiring an audio-description signal associated with the audiovisual content and synchronized on said audiovisual content, the audio-description signal comprising data called audio-description data describing the events appearing in the audiovisual content, and
 reproducing, during the temporal interval provided for the display of said at least one sensitive segment, the audio-description data of the audio-description signal.

Thus, according to the invention, the audio-description signal that is normally intended for blind or poor-sighted people is reproduced during the temporal interval initially intended for the display of the sensitive sequence.

This audio-description signal is synchronised on the video and describes via audio data, called audio-description data, the content of sequences of the film or programme. The fact that the audio signal is generated directly, and not by vocal synthesis as in the prior art, enables, as concerns the quantity of information transmitted, not being limited by the reading capacity of the viewer.

The audio-description signal also has the advantage of being already available for numerous films and/or programmes. The implementation of the method thus does not require that the equipment for the diffusion of the film or audiovisual programme be equipped with additional means or that the supports used to store the audiovisual content comprise additional tracks other than the audio-description track.

Finally, the use of this audio-description signal guarantees the use of an appropriate language that does not risk adversely affecting the young public.

According to a particular embodiment, the detection of the sensitive segment is carried out manually using a user interface.

According to another embodiment, the detection of the sensitive segment is carried out automatically.

According to a particular embodiment, the audiovisual segments responding to the predetermined criterion are audiovisual segments comprising physical or verbal violence and/or sex.

The present invention also relates to a reproduction device for audiovisual content comprising a plurality of audiovisual segments, each of the audiovisual segments being intended for display during an associated temporal interval, comprising:

acquisition means of said audiovisual content and an audio-description signal associated with the audiovisual content and synchronised on said audiovisual content, the audio-description content comprising data called audio-description data describing the events appearing in the audiovisual content, characterized in that it also comprises:

means for detecting among said audiovisual segments at least one audiovisual segment responding to the predetermined criterion, called a sensitive segment, means for deleting said sensitive segment in the audiovisual content, and means for reproducing audiovisual segments excepting said at least one sensitive segment and, during the temporal interval provided for the displaying of said at least one sensitive segment, for reproducing audio data of the audio-description signal.

According to a particular embodiment, the means for detecting are constituted by a user interface.

BRIEF DESCRIPTION OF THE DRAWINGS

The invention will be better understood, and other aims, details, characteristics and advantages will appear more clearly over the course of the detailed description which follows in referring below to the figures in the appendix, showing in.

DETAILED DESCRIPTION OF PREFERRED EMBODIMENTS

According to the invention, it is proposed to replace the display of sensitive sequences of an audiovisual content with the reproduction of audio data from an audio-description signal associated with said audiovisual content.

The audio-description signal is known as an aid for blind or visually impaired persons to facilitate their comprehension of a programme or film. The audio description provides a description on the events taking place in the audiovisual content. This signal is synchronised on the video signal. In the case of a terrestrial broadcast of the audiovisual content, the audio-description signal is transmitted at the same time as the audiovisual content. This audio-description signal is possibly pre-mixed with the principal audio component of the broadcast programme. In the case of an audiovisual content stored on a support such as a DVD, the audio-description signal is provided on an additional track of the support.

According to the invention, the audiovisual sequences responding to a pre-determined criterion, for example the sequences comprising sex and/or violence, known as sensitive sequences, are not displayed and, in their place, the audio-description signal associated with the audiovisual content is read during the temporal interval initially intended for the display of these sequences. Thus the viewer acquires via the audio-description signal information describing the sequence that is not displayed and enabling him to correctly follow the progression of the audiovisual content. The audio data of the audio-description signal are not dialogues. There is therefore no risk that these data comprise phrases or words that could be assimilated with verbal violence.

Figure 1:
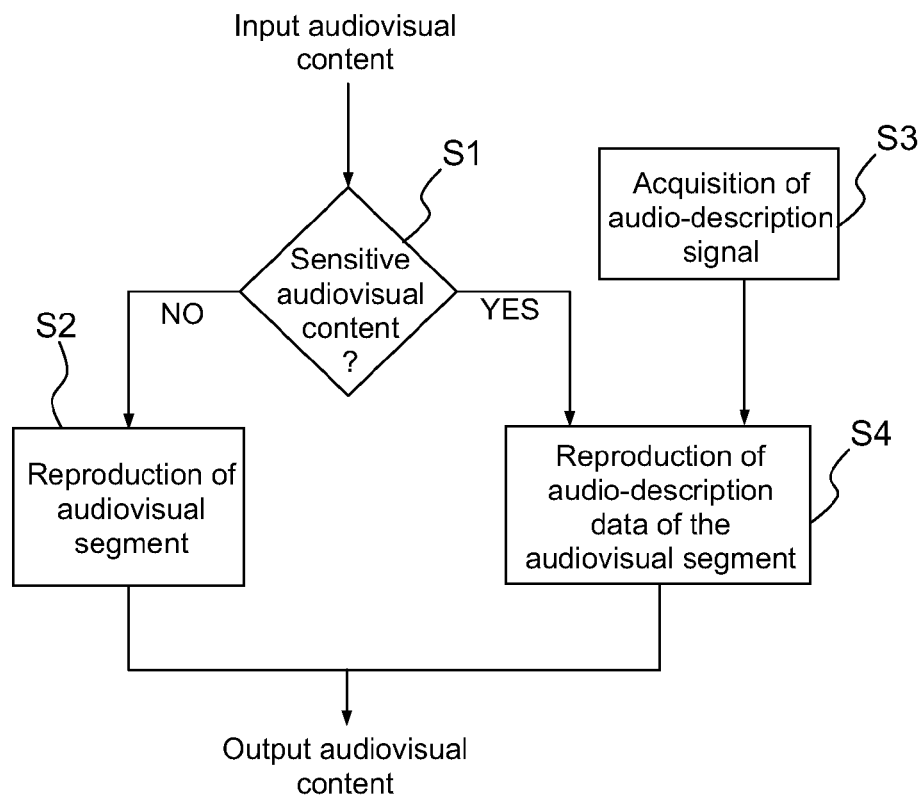
FIG. 1 shows a flow chart of the steps of the method according to the invention, and FIG. 2 schematic block diagram of a device capable of implementing the method of the invention.

In reference to FIG. 1, the method of the invention comprises a step S1 intended to detect from among the audiovisual segments of the audiovisual content, a sensitive sequence comprising for example sex and/or violence. According to step S2, if the audiovisual sequence that is playing is not a sensitive sequence, then it is reproduced. Otherwise, if a sensitive sequence is detected in step S1, during the temporal interval, the audio-description data of the audio-description signal are reproduced (step S4), the acquisition signal having been previously acquired during a preceding step S3.

The detection of sensitive sequences can be operated manually by means of a user interface. For example, when the parents are watching television with their children, one of the parents presses a "censure" button of the remote control, this button being programmed to stop the display of images that are playing and the reproduction of the corresponding sound and replace them by the reproduction of the audio-description signal. The parent presses the "censure" button again when the audio-description data indicate that the sensitive sequence is ended to return to the normal display of the audiovisual content. This detection can also be carried out during a pre-viewing of the audiovisual content by the parents. Over the course of this pre-viewing, the parents mark or timestamp the start and the end of the sensitive sequences. An option called the censure option in the reproduction device of the audiovisual content is responsible for replacing the marked sequences with the audio-description signal. When this option is activated in the video player, the replacement of marked scenes is then automatic for later viewing of the content. Thus, even if the parents are not present, the children can view the audiovisual content in which the sensitive sequences will be automatically replaced by the audio-description.

In a variant, the detection of sensitive sequences can be carried out automatically by known detection methods, for example by the violence detection method described in the document "Person-on-Person Violence Detection in Video Data", A. Datta, M. Shah and N. V. Lobo, IEEE international Conference on Pattern Recognition, Canada, 2002.

According to a variant of the invention, a set of sensitive sequences temporally close can be assimilated to the detection of a single sensitive sequence of a duration corresponding to the time interval between the start of the first sequence detected and the end of the last. With this objective, the minimal viewing time of non-sensitive sequences between two sensitive sequences is determined. If this determined time is not reached, a re-grouping between the preceding sensitive zone, the intermediate non-sensitive zone and the next sensitive zone is carried out and the audio-description data of the audio-description signal are reproduced over the temporal interval associated with this regrouping.

The purpose of the method and the device described above is to censure violent or sex scenes from the audiovisual content. Naturally, the method can be adapted to censure other types of scenes, for example scenes comprising persons who are smoking or drinking. The step of detection is then to be adapted according to the censure criterion retained. If scenes comprising persons drinking are to be censured, then the method described in the document titled "Retrieving actions in movies" I. Laptev and P. Perez, ICCV, 2007 for example can be used.

Figure 2:
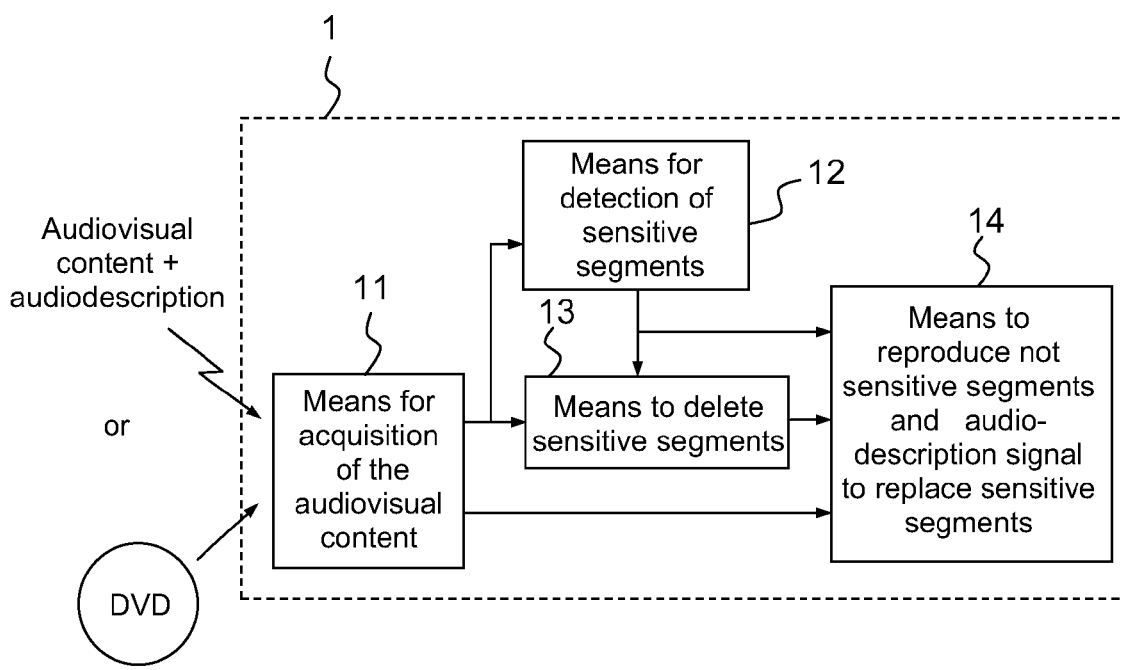

FIG. 2 shows the block diagram of an audiovisual content reproduction device in accordance with the invention. It comprises means for acquisition 11 of the audiovisual content and the audio-description signal. The audiovisual content and the audio-description signal can be received from a network, for example the DTT (Digital Terrestrial Television) network, or from a DVD. The device also comprises means for detection 12 to detect sensitive segments. As indicated previously, it can be a user interface comprising a programmed "censure" button. The device comprises means 13 to delete detected sensitive segments. And finally, it comprises means 14 to reproduce audiovisual segments that are not sensitive and, during the temporal interval originally intended for the reproduction of sensitive segments, to reproduce audio data of the audio-description signal.

According to a variant of the invention, the set of audiovisual data of non-sensitive segments and the audio data of the audio-description data for the sensitive segments can be recorded on any support such as a unique data stream responding to certain determined sensitivity criteria. The indication of these criteria can in this case be indicated on the recording support.

The invention claimed is:

1. A method for processing audiovisual content having a plurality of audiovisual segments, each of the audiovisual segments being intended to be displayed during an associated temporal interval, said method comprising:
   detecting among said audiovisual segments at least one audiovisual segment responding to a sensitive segment criterion,
   displaying sequentially on a screen said audiovisual segments with the exception of said at least one sensitive segment,
   wherein the displaying further comprises:
   acquiring an audio-description signal associated with the audiovisual content and synchronized on said audiovisual content, the audio-description signal comprising audio-description data describing the events appearing in said at least one sensitive segment in the audiovisual content, and being normally intended for blind or visually impaired persons, and
   outputting, during the temporal interval intended for the display of said at least one sensitive segment, the audio-description data of the audio description signal;
   wherein a grouping together of several sensitive segments as well as intermediary periods is assimilated into a single sensitive segment.

2. The method according to claim 1, wherein the detection of the sensitive segment is carried out manually using a user interface.

3. The method according to claim 1, wherein the detection of the sensitive segment is carried out automatically.

4. The method according to claim 1, wherein the audiovisual segments responding to the predetermined criterion are audiovisual segments which comprise physical or verbal violence and/or sex.

5. A reproduction device for audiovisual content having a plurality of audiovisual segments, each of the audiovisual segments being intended for display during an associated temporal interval, the device comprising:
   a demodulator circuit for acquiring said audiovisual content and an audio-description signal associated with the audiovisual content and synchronized on said audiovisual content, the audio-description signal comprising audio-description data describing the events appearing in said at least one sensitive segment in the audiovisual content, and being normally intended for blind or visually impaired persons;
   the demodulator circuit further comprising:
   control circuitry configured to:
   detect among said audiovisual segments at least one audiovisual segment constituting a sensitive segment; and
   delete said sensitive segment in the audiovisual content, and output audiovisual segments excepting said at least one sensitive segment and, during the temporal interval intended for the displaying of said at least one sensitive segment, output audio data associated with the audio-description signal;
   wherein a grouping together of several sensitive segments as well as intermediary periods is assimilated into a single sensitive segment.

6. The reproduction device according to claim 5, wherein the control circuitry comprises a user interface.

7. The reproduction device according to claim 5, wherein an audiovisual segment constituting sensitive segments includes content depicting physical or verbal violence and/or sex.

* * * * *